United States Patent [19]

Verduijn

[11] Patent Number: 5,017,353

[45] Date of Patent: May 21, 1991

[54] RECYCLED ZEOLITE L PREPARATION

[75] Inventor: Johannes P. Verduijn, Spijkenisse, Netherlands

[73] Assignee: Exxon Research and Engineering Co., Florham Park, N.J.

[21] Appl. No.: 228,877

[22] Filed: Aug. 5, 1988

Related U.S. Application Data

[63] Continuation of Ser. No. 870,352, Jun. 4, 1986, abandoned, which is a continuation of Ser. No. 667,979, Nov. 5, 1984, abandoned.

[30] Foreign Application Priority Data

Nov. 10, 1983 [GB] United Kingdom ................ 8329973

[51] Int. Cl.$^5$ ............................................. C01B 33/34
[52] U.S. Cl. ........................................ 423/328; 502/64
[58] Field of Search ...................... 423/328, 329, 330; 502/60

[56] References Cited

U.S. PATENT DOCUMENTS

| | | | |
|---|---|---|---|
| 3,012,853 | 12/1961 | Milton | 423/328 |
| 3,425,800 | 2/1969 | Hirsh | 423/329 |
| 3,867,512 | 2/1975 | Young | 423/329 |
| 4,041,135 | 8/1977 | Williams et al. | 423/329 |
| 4,164,551 | 8/1979 | Elliot, Jr. | 423/330 |
| 4,330,518 | 5/1982 | Kostinko | 423/328 |
| 4,385,042 | 5/1983 | Whitehurst et al. | 423/329 |
| 4,530,824 | 7/1985 | Arika et al. | 423/328 |
| 4,544,539 | 10/1985 | Wortel | 423/329 |
| 4,552,731 | 11/1985 | Vaughan | 423/118 |
| 4,554,146 | 11/1985 | Vaughan | 423/118 |

FOREIGN PATENT DOCUMENTS

| | | | |
|---|---|---|---|
| 0109199 | 5/1984 | European Pat. Off. | 423/328 |
| 0142347 | 5/1985 | European Pat. Off. | 423/328 |
| 0142349 | 5/1985 | European Pat. Off. | 423/328 |
| 0142354 | 5/1985 | European Pat. Off. | 502/60 |
| 2640541 | 3/1978 | Fed. Rep. of Germany | 423/328 |
| 2744784 | 8/1978 | Fed. Rep. of Germany | 423/329 |
| 2853986 | 6/1979 | Fed. Rep. of Germany | 423/328 |
| 1115489 | 5/1968 | United Kingdom | 423/329 |

OTHER PUBLICATIONS

Himmelblau, D. M., "Basic Principles and Calculations in Chemical Engineering", 4th Ed., Prentice-Hall, N.J. (1982) pp. 154–156.

Primary Examiner—H. M. S. Sneed
Assistant Examiner—R. Bruce Breneman
Attorney, Agent, or Firm—Sandler, Greenblum & Bernstein

[57] ABSTRACT

Zeolite L is prepared in a process employing a mother liquor recycle by adjusting the alkalinity of the crystallization gel containing the mother liquor to suppress zeolite W formation and optionally heat treating the mother liquor prior to recycle to remove zeolite W nuclei and/or crystallites. The technique is especially suitable for the formation of zeolite L with cylindrical morphology from a crystallization gel comprising (in mole ratios of oxides):

| | |
|---|---|
| $K_2O/SiO_2$ | 0.22–0.36 |
| $H_2O/K_2O$ | 25–90 |
| $SiO_2/Al_2O_3$ | 6–15 |

The cylindrical Zeolite L may be used as a catalyst base in aromatization of acyclic hydrocarbons with high benzene yields being sustained over commercially feasible periods.

6 Claims, No Drawings

RECYCLED ZEOLITE L PREPARATION

This is a continuation of application Ser. No. 870,352, filed June 4, 1986, now abandoned, which in turn is a continuation of application Ser. No. 667,979, filed Nov. 5, 1984, now abandoned.

This invention relates to the preparation of zeolite L and in particular it relates to the preparation of a zeolite L with cylindrical morphology.

Zeolite L has been known for some time as an adsorbant, and in U.S. Pat. No. 3,216,789 is described as an aluminosilicate of the formula:

$$0.9\text{–}1.3\ M_{2/n}O: Al_2O_3:5.2\text{–}6.9SiO_2:yH_2O$$

(where M is an exchangeable cation of valence n and y is from 0 to 9) having an X-ray diffraction pattern with the following more significant d(Å) values:

16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

The preparation of zeolite L described in U.S. Pat. No. 3,216,789 comprises crystallizing the zeolite from a reaction mixture comprising mole ratios:

| | |
|---|---|
| $K_2O/(K_2O + Na_2O)$ | 0.33–1 |
| $(K_2O + Na_2O)/SiO_2$ | 0.35–0.5 |
| $SiO_2/Al_2O_3$ | 10–28 |
| $H_2O/(K_2O + Na_2O)$ | 15–41 | and describes crystallization temperatures of from 100° C. to 150° C.

British Patent 1 202 511 describes a revised zeolite L preparation using lower proportions of silica in the reaction mixture which comprises mole ratio of reactants as:

| | |
|---|---|
| $K_2O/(K_2O + Na_2O)$ | 0.7–1 |
| $(K_2O + Na_2O)/SiO_2$ | 0.23–0.35 |
| $SiO_2/Al_2O_3$ | 6.7–9.5 |
| $H_2O/(K_2O + Na_2O)$ | 10.5–50 | and a crystallization temperature of from 100° C. to 200° C. The ratio $H_2O/(K_2O+Na_2O+SiO_2+Al_2O_3)$ is preferably not greater than 6 to give a "dry gel".

U.S. Pat. No. 3,867,512 discloses a preparation of zeolite L from a reaction mixture having a molar composition:

| | |
|---|---|
| $K_2O/(K_2O + Na_2O)$ | 0.3–1 |
| $(K_2O + Na_2O)/SiO_2$ | 0.3–0.6 |
| $SiO_2/Al_2O_3$ | 10–40 |
| $H_2O/(K_2O + Na_2O)$ | 15–140 | in which the silica source is a gel having at least 4.5 weight percent water and prepared in a particular manner. The zeolite L is prepared at temperatures of from 140° F. to 280° F. (60° C. to 138° C.). L. Wilkosz in Pr Chem 409 (1974)—Chemical Abstracts, vol 90 (1979) 57347f describes the preparation of zeolite L from a synthesis sol prepared by treating a solution containing silica, potassium hydroxide and sodium hydroxide with a second solution containing potassium aluminate, potassium hydroxide and sodium hydroxide and crystallizing for 72 hours at 20° C. and 122 hours at 100° C. The zeolite L product has a $SiO_2:Al_2O_3$ ratio of 6.4:1.

G. V. Tsitsishvilli et al in Doklady Akademii NaukSSSR, Vol 243, No 2, pp438–440 (1978) describe the synthesis of zeolite L from alumina-silica gels containing tributylamine. The gels used had the following molar ratios:

| | |
|---|---|
| $SiO_2:Al_2O_3$ | 25 |
| $(K_2O + Na_2O):Al_2O_3$ | 18 |
| $(K_2O + Na_2O):SiO_2$ | 0.72 |
| $H_2O/K_2O + Na_2O$ | 20 |
| $K_2O:Na_2O$ | 0.5 |

Crystallization temperatures of 90° C. and 98° C. were employed.

Y. Nishiimura in Nippon Kagaku Zasshi 91, 11, 1970, pp 1046–9 describes in general terms zeolite L preparation from a synthesis mixture containing colloidal silica, potassium aluminate and potassium hydroxide having a $SiO_2:Al_2O_3$ ratio of 15–25 at a temperature of 100° C., but exemplifies only two synthesis mixtures having the following ratios of components:

$7K_2O:Al_2O_3:20SiO_2:450H_2O$; and
$8K_2O:Al_2O_3:10SiO_2:500H_2O$.

Frety et al in C R Acad Sc Paris, t275, Serie C-1215 describes the electron microscope examination of zeolite L in which particles were said to be observed in the form of slightly deformed cylinders with very variable dimensions.

It was subsequently found that zeolite L may be used as a catalyst base in aromatization reactions. U.S. Pat. No. 4,104,320, discloses dehydrocyclization of aliphatic compounds in the presence of hydrogen using a catalyst comprising zeolite L and a group VIII metal, in which the zeolite L is of the formula:

$$M_{9/n}(AlO_2)_9(SiO_2)_{27}$$

(where M is a cation of valence n) but the silica to alumina ratio may vary from 5 to 7. Zeolite L is described as occuring in the form of cylindrical crystals a few hundred Angstroms in diameter.

European Patent Application Publication 40119 discloses a dehydrocyclization process operating at low pressure (1 to 7 bars) or low $H_2$/hydrocarbon ratio using a catalyst comprising platinum on a potassium zeolite L. BE 888365 describes dehydrocyclization using a catalyst comprising platinum, rhenium (incorporated in the form of its carbonyl) and sulphur to give an atomic ratio of sulphur to platinum of 0.05 to 0.6 on a zeolitic crystalline aluminosilicate base such as zeolite L. BE 792608 discloses the treatment of zeolite L for use as catalyst in isomerization by exchange with ammonium and chromium ions.

In the known syntheses for zeolite L the product is separated from the mother liquor and the latter is then discarded with a consequent waste of expensive reactants. It has now been found that a controlled recycle of the mother liquor is possible with a consequent economic saving in commercial production of zeolite L.

Accordingly, in one aspect of this invention provides a a modification of the process for the preparation of zeolite L in which a zeolite L crystallization gel comprising an alkaline mixture of water, a source of silicon and a source of aluminium is heated to form zeolite L and the formed zeolite L is separated from a mother liquor, in which modification at least a part of the mother liquor is used as a component of a second zeolite L crystallization gel in which the alkalinity is selected to suppress formation of zeolite W, and the second gel is heated to form further zeolite L. Thus the invention provides a process for the preparation of zeolite L by heating a zeolite L crystallization gel comprising an alkaline mixture of water, a source of silicon and a source of aluminium to form zeolite L which is then separated from a mother liquor, in which the crystallization gel comprises at least a part of the mother liquor separated from a previous crystallization and the gel is formulated with an alkalinity at which zeolite W formation is inhibited. Zeolite W tends to be formed in some extremes of composition of zeolite L crystallization gels. We have found that it i advantageous for the zeolite W content of the product to be minimized since the lower the zeolite W content the better the performance of zeolite L as a catalyst base.

References herein to Zeolite W refer to the material described as such by D W Breck in "Zeolite Molecular Sieve", Wiley Interscience, 1974, also described as Zeolite KM in "Zeolite Technology and Application, Recent Advances", J Scott, Noyes Data Corpn., U.S.A., 1980, p36. The zeolite W content of the product can be monitored by its X-ray diffraction pattern. A characteristic prominant line in the zeolite W XRD pattern is at $2\theta=12.5\pm0.1°$ (d=7.09 Å), while a prominant line in the zeolite L XRD pattern is at $2\theta=22.7°$ (d=3.91±0.03 Å). The relative peak intensities of these peaks can be compared to determine the relative proportions of the two zeolite types, since these peaks are not obscured in mixtures of the two zeolites. It is a preferred feature that the product of the process of the invention has an XRD pattern in which the peak height ratio (d=7.09 Å)/(d=3.91 Å) (hereinafter referred to as the "W/L ratio") is not greater than 0.3, more preferably not greater than 0.2. Very preferably the product is substantially free of zeolite W as evidenced by an absence of the XRD pattern of a line at a d spacing of 7.09 Å, and also preferably substantially free of any additional crystalline phase giving rise to a line in the X-ray pattern at d (Å) value of 6.28±0.05 and/or 3.14±0.02.

The term "zeolite L crystallization gel" is used to refer to any gel which provide zeolite L product when subjected to zeolite crystallization conditions. Such gels are described in the prior art discussed hereinbefore. However, a preferred zeolite L crystallization gel is that described in our copending European Patent Application Publication No. 96479 which has been found to provide a highly crystalline zeolite product similar to conventional zeolite L but having a characteristic crystallite size and cylindrical morphology, which product has shown excellent activity and life characteristics when used as a catalyst base in hydrocarbon conversions such as aromatization of acyclic hydrocarbons. These products are described herein as the "preferred zeolite L" or "cylindrical zeolite L".

The preferred zeolite L produced by the invention is preferably characterized by at least 50%, more preferably 70% and most preferably 85%, of the crystallites being cylinders. The aspect ratio of the cylindrical crystallites is preferably from 0.5 to 1.5, more preferably from 0.8 to 1.5.

A further particularly surprising feature of the preferred zeolite L is that large crystallites wherein the mean diameter of the cylinders is at least 0.1 micron may be prepared. The cylindrical particles preferably have a mean diameter of at least 0.5 micron, more preferably at least 0.75 micron and most preferably at least 0.9 micron. The crystallites are generally in the range of from 0.8 to 4 micron, usually at least 1.0 micron and/or not more than 3.0 micron.

It is a further surprising feature of the preferred process of the invention that the zeolite with cylindrical morphology may be prepared by controlling the composition of the reaction mixture within certain limits, and that mother liquor may be recycled to form further gels giving good yields of the preferred zeolite L.

Thus, in a preferred aspect this invention provides a process for the preparation of zeolite L comprising cylindrical crystallites preferably with an aspect ratio of at least 0.5, in which a zeolite L crystallization gel comprising an alkaline reaction mixture of water, a source of silicon and a source of aluminium and having a composition falling within the following molar ratios (expressed as oxides):

| | |
|---|---|
| $M_{2/n}O/SiO_2$ | 0.22–0.36 |
| $H_2O/M_{2/n}O$ | 25–90 |
| $SiO_2/Al_2O_3$ | 6–15 |

(wherein M is a cation of valence n, and preferably potassium or a mixture of K+M' in which M' is an alkali metal or alkaline earth metal such as sodium, calcium, barium, or rubidium, provided that $K_2O/(M'_{2/n}O+K_2O)$ is at least 0.7) is heated to a temperature of from at least 75° C. and preferably from 100° C. to 250° C., more preferably from 120° C. to 225° C., to form the desired cylindrical zeolite L, the formed zeolite L is separated from a mother liquor, the separated mother liquor is used in the formation of a second crystallization gel having a composition as defined hereinbefore and in which the alkalinity is selected to suppress zeolite W formation, and the second gel is heated to form further zeolite L.

The zeolite L prepared in this way is preferably aluminosilicate and is described as such hereinafter, though other elemental substitutions are possible, for example aluminium may be substituted by gallium, boron, iron and similar di- or trivalent elements which are known to exist in tetrahedral coordination, and silicon may be substituted by elements such as germanium or phosphorus, and the invention extends to such alternative products. The aluminosilicates preferably have a composition (expressed in terms of molar ratios of the constituent oxides in anhydrous form) of:

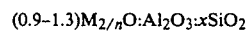

(0.9–1.3)$M_{2/n}O$:$Al_2O_3$:$xSiO_2$ (I)

wherein M is a cation of valence n, x is from 5 to 7.5, preferably from about 5.7 to about 7.4. The preferred cylindrical zeolite L prepared by the invention has high crystallinity as shown by a well-defined X-ray diffraction pattern (without binder or other diluents present)

with sharp peaks. The exchangeable cation M in general formula I is very preferably potassium, but it is possible for a part of M to be replaced by other cations such as alkali and alkaline earth metals for example sodium, rubidium or caesium. The ratio $M_{2/n}O: Al_2O_3$ is preferably from about 0.95 to about 1.15, and generally above 1.

In general formula I the symbol x (the mole ratio $SiO_2:Al_2O_3$) more preferably represents from 6 to 7 and most preferably from 6.0 to 6.5.

The zeolite L may be hydrated, typically with up to 9 moles of water per mole of $Al_2O_3$. When used as a catalyst base, as described hereinafter, the zeolite L is preferably first calcined to remove water. In normal preparation from aqueous gels a hydrated form is first prepared and this may be dehydrated by heating.

There are four principle components to the reaction mixture or synthesis gel and thus generally:

---
aluminium
silicon
potassium (optionally with up to 30 mole % replaced by alkali or alkaline earth metal)
water
--- and the particularly preferred proportions of these four components in a fresh gel to provide the desired cylindrical zeolite L are described in European Patent Application Publication No. 96479.

A preferred zeolite L crystallization gel for crystallization at 150° C. when prepared from fresh materials is obtained within the following preferred ranges:

| | |
|---|---|
| $K_2O/SiO_2$ | 0.24–0.30 |
| $H_2O/K_2O$ | 35–65 |
| $SiO_2/Al_2O_3$ | 8–12 |

When the mother liquor from this preferred zeolite L crystallization gel is recycled to form a second gel it has been found advantageous to adjust the alkalinity of that second gel as defined by the mole ratio of $K_2O/Al_2O_3$ to 2.8–3.0, preferably 2.85–2.95, to reduce the tendency for zeolite W formation in the product. In this way it is possible to utilize the mother liquor in the second crystallization and obtain a zeolite product with a W/L ratio of not greater than 0.3, preferably not greater than 0.2.

The amount of mother liquor recycled to the second crystallization gel may be maximised within the constraints on the composition of the second gel. In general the mother liquor comprises from 10 to 90 wt % of the second gel, and preferably from 30 to 85 wt %, more preferably 40 to 75 wt %, of the second gel.

It may be desirable to recycle the mother liquor from the second and subsequent crystallizations and thus to employ a cascade recycle enabling maximum utilization of the starting materials to be achieved. It has been found desirable that when the W/L ratio of the product from a crystallization is greater than 0.1, and preferably when the ratio is greater than 0.05, the separated mother liquor is treated prior to recycle in order to reduce zeolite W nuclei and/or zeolite W crystallites. We have found that various methods may be used to remove these potential contaminants. In particular the mother liquor may be heated until sufficient zeolite W nuclei and/or crystallites are removed, for example, by being converted to non-zeolitic phases or by dissolution, to ensure that a crystallization gel containing the heat treated mother liquor will crystallize to form a product with a W/L ratio of not greater than 0.3, preferably not greater than 0.2.

The appropriate heat treatment can be determined empirically for a particular mother liquor, for example by using small samples to prepare a second crystallization gels and investigating the decrease in the W/L ratio in the product obtained from such gels as a result of heat treatment of the mother liquor. In general the higher the temperature the shorter the period of heating required to effect adequate conversion. By way of illustration a temperature of 175° C. or greater is preferred, more preferably 200° C. or greater and times at least 12 hours are preferable, more preferably at least 36 hours.

Although described in detail in relation to the optimum gel for synthesizing cylindrical zeolite L at a temperature of 150° C., it is to be appreciated that the recycle procedure of the invention may be applied to other zeolite L syntheses.

In particular it may be applied to the preparation of cylindrical zeolite L carried out under different reaction conditions and in particular at different crystallization temperature. By using different temperatures it is possible to deviate further from the optimum composition defined above for a crystallization temperature of 150° C. and yet still obtain the desired product. In general, within the broad reactant ratios defined for the process of the invention a higher crystallization temperature enables the silicon content to be lowered and/or the water content to be lowered and/or the potassium content to be raised. By contrast operating at lower temperatures tends to decrease the nucleation rate which can be countered by lowering the alkalinity and/or by increasing the water content and/or by introducing seeds of preformed zeolite L. Lowering the alkalinity may also counteract this drop in nucleation by decreasing the gel depolymerization rate.

Crystallization time is related to the crystallization temperature. The crystallization is preferably carried out in the region of 150° C. and at this temperature the crystallization time may be from 24 to 96 hours, typically from 48 to 72 hours. Lower temperatures ma require much longer times to achieve good yield of the desired product, whereas times of less than 48 hours are possible when higher temperatures are used and times of 5 to 24 hours may be preferred.

The crystallization is generally carried out in a sealed autoclave and thus at autogenous pressure. Lower pressure will require longer crystallization times.

Following the preparation as described above the zeolite L is separated from the mother liquor, washed and dried in the normal manner.

The products of the processes of the invention described hereinbefore are preferably substantially free from contaminant crystalline and amorphous materials. However, in employing these products in catalytic applications it may be desired to combine them with additional crystalline or amorphous materials and this invention extends to such combinations.

We have found that the products of the invention are excellent catalyst bases and may be used in a wide variety of catalytic reaction. The particular morphology of the crystals appears to result in a particular stable base for catalytically active metals with a surprising resistance to catalyst deactivation. In addition, they have displayed low acidity which makes them especially suited to catalytic applications where a low acid site strength is advantageous such as aromatization.

The invention will now be described in more detail, though only by way of illustration, in the following Preparations and Examples.

Preparation 1: Preparation of Zeolite L

A synthesis gel was prepared having the following composition expressed in moles of pure oxide:

$$2.62K_2O:Al_2O_3:10SiO_2:160H_2O$$

This gel was prepared as follows: 23.40 g of aluminium hydroxide was dissolved by boiling in an aqueous solution of 51.23 g of potassium hydroxide pellets (86% pure KOH) in 100.2 g of water to form solution A. After dissolution any water loss was corrected. A separate solution, solution B, was prepared by diluting a 225 g of colloidal silica (Ludox HS40) with 195.0 g of water.

Solutions A and B were mixed for two minutes to form a gel, and just before the gel became fully stiff it was transferred to Teflon-lined autoclaves, placed in an oven preheated to 150° C. and held at that temperature for 72 hours to bring about crystallization.

The formed Zeolite L was highly crystalline with a typical Zeolite L X-ray diffraction (XRD) pattern.

Scanning electron micrographs (SEM) show the product to be formed solely of well-defined cylindrical crystals having a particle size of 2 to 2.5 microns. The $SiO_2:Al_2O_3$ ratio in the product was 6.3. The $K_2O:Al_2O_3$ ratio was measured as 0.99.

Aromatization processes using such catalysts are described, for example, in U.S. Pat. No. 4,104,320, BE 888365 or EP 40119.

Preparation 2: Scaled-up synthesis

The synthesis of Preparation 1 was repeated in a 2 liter autoclave with a diameter of 10.2 cm using amounts of reactants increased to give a total synthesis gel weight of 1709 grams. A heating-up period of 9 hours was employed to bring the gel to the crystallization temperature of 150° C. so that a maximum temperature difference of 10° C. was obtained in the gel. 260 grams of a highly crystalline zeolite L product was obtained, with the crystals having a particle size of 1 to 1.5 microns and substantially all of the particles having a cylindrical morphology.

EXAMPLE 1

Mother Liquor Recycle

A series of syntheses were carried out using mother liquor recycle. In each case the procedure of Preparation 1 was repeated and the formed zeolite L was separated from the mother liquor. This mother liquor had an approximate composition, in terms of mole ratios of oxides:

$$1.6K_2O:4SiO_2:150H_2O$$

A second crystallization gel was prepared using a solution A comprising aluminium hydroxide, potassium hydroxide and was an a solution B comprising Ludox HS40 and water. These solutions were combined to form a pre-gel to which was added the recovered mother liquor to form the second crystallization gel. The resulting gel contained approximately 51 wt % of mother liquor. The proportions of the components of solutions A and B are selected so that when combined with the mother liquor the desired gel composition is obtained.

It was observed that the obtained gel forms more rapidly than in the first crystallization and that the gel appeared physically drier than in the first crystallization even though the water content was similar.

In the series of tests different alkalinities for the second crystallization gel were evaluated as indicated in Table 1 below.

In each case the second gels were crystallized for 72 hours at 150° C. in a 300 ml autoclave.

TABLE 1

| Second crystallization gel-mole ratio | Zeolite Product | | | |
|---|---|---|---|---|
| | W/L ratio$^a$ | Morphology | Size (μm) | Aspect ratio |
| $2.5K_2O.Al_2O_3.10SiO_2.165H_2O$ | 1.8 | — | — | — |
| $2.7K_2O.Al_2O_3.10SiO_2.165H_2O$ | 0.4 | cylinder | 2 | 0.9 |
| $2.8K_2O.Al_2O_3.10SiO_2.165H_2O$ | 0.2 | cylinder | 1.5 | 0.8 |
| $2.9K_2O.Al_2O_3.10SiO_2.165H_2O$ | 0 | cylinder | 1-1.5 | 0.5 |
| $3.3K_2O.Al_2O_3.10SiO_2.165H_2O$ | 0 | clam | 0.5-1 | — |

$^a$W/L ratio = XRD peak height ratio W(12.6°)/L(22.7°).

These results show that by increasing the alkalinity of the second gel to the range of 2.8-3.0 moles of $K_2O$ a cylindrical zeolite L product is obtained with a W/L ratio of not greater than 0.2.

EXAMPLE 2

Repeated Mother Liquor Recycle

The procedure described in Example 1 for preparing a second crystallization gel was repeated, and following crystallization of zeolite L the mother liquor was again separated and recycled. A total of 5 recycles were carried out and the results are given in Table 2 below.

TABLE 2

| Recycle No. | Gel composition (moles) | Zeolite Product | | Size (μm) | Aspect ratio |
|---|---|---|---|---|---|
| | | W/L ratio | Morphology | | |
| 1 | $3.05K_2O.Al_2O_3.10SiO_2.165H_2O$ | 0 | cylinder | 1.5 | 0.4-0.5 |
| 2 | $3.0K_2O.Al_2O_3.10SiO_2.165H_2O$ | 0 | cylinder | 1-1.5 | 0.7 |
| 3 | $2.9K_2O.Al_2O_3.10SiO_2.165H_2O$ | 0.03 | cylinder | 1.5-2 | 0.8 |
| 4 | $2.8K_2O.Al_2O_3.10SiO_2.165H_2O$ | 2 | — | — | — |
| 5 | $3.0K_2O.Al_2O_3.10SiO_2.165H_2O$ | pure W | — | — | — |

This Example shows that repeated recycle of mother may be employed. Without treatment of the mother liquor three recycles gave the desired cylindrical zeolite L product.

EXAMPLE 3

Thermal treatment of mother liquor

A mother liquor from a zeolite preparation (as in Preparation 1) yielding a product having a W/L ratio of 0.06 was divided into 3 portions.

One portion was untreated and used to make up a new crystallization gel containing about 54 wt % of the portion and made up to a composition of: $2.93K_2O:Al$-

$_2O_3:10SiO_2:160H_2O$. Zeolite L was prepared by crystallization for 67.5 hours at 150° C. in a 300 ml autoclave.

The second portion was centrifuged for 40 minutes at 3400 rpm and then used in the same gel composition as the first portion to prepare zeolite L under the same conditions.

The third portion was thermally treated for 48 hours at 200° C. and again used in the same gel composition as the first portion to prepare zeolite L under the same conditions.

The results are given in Table 3 below and show that thermal treatment reduces the W/L ratio of the product from the recycled mother liquor, but centrifugation is not effective.

TABLE 3

| Type of mother liquor | Zeolite product W-content (W/L) |
|---|---|
| untreated | 0.44 |
| centrifuged[a] | 0.42 |
| thermally treated[b] | 0.10 |

[a] 40 minutes at 3400 rpm
[b] 48 hours at 200° C.

I claim:

1. A process for the preparation of zeolite L comprising cylindrical crystallites, in which process a first L crystallization gel comprising an alkaline reaction mixture of water, a source of silicon and a source of aluminum and having a composition falling within the following molar ratios (expressed as oxides):

| $M_{2/n}O/SiO_2$ | 0.22–0.36 |
|---|---|
| $H_2O/M_{2/n}O$ | 25–90 |
| $SiO_2/Al_2O_3$ | 5.7–15 |

(wherein M is potassium or a mixture of K+M' wherein M' is an alkali metal or alkaline earth metal and the ratio $K_2O/(M'_{2/n}O+K_2O)$ is at least 0.7) is heated to a temperature of from at least 75° C. up to about 225° C. to form the said cylindrical crystalline zeolite L having at least 50% of its crystallites in the form of cylinders having an aspect ratio of 0.5 to 1.5 and a mean diameter of at least 0.5 micron, the formed zeolite L is separated from a mother liquor, the separated mother liquor is heated to a temperature of at least about 175° C. for at least about 12 hours, until sufficient zeolite W nuclei and/or crystallites are converted to non-zeolitic phases, and the separated mother liquor is then used in the formation of a second crystallization gel and is present in an amount of from 10 to 90 wt % of said second gel which has a composition as defined hereinbefore and in which the alkalinity is such that the antecedent ratio of $K_2O$ to $Al_2O_3$ is 2.8 to 3.0, zeolite W formation being thereby suppressed, and the second gel is heated to form further cylindrical crystallite zeolite L wherein the ratio of zeolite W to zeolite L is less than 0.3.

2. A process as claimed in claim 1, in which the second zeolite crystallization gel comprises reactants in the following molar ratios (expressed as oxides):

$M_{2/n}O/SiO_2 = >0.25$
$H_2O/M_{2/n}O = <65$
$SiO_2/Al_2O_3 = 7.5-10.5$

3. A process as claimed in claim 1, in which the first zeolite L crystallization gel has a composition within the following ranges:

| $K_2O/SiO_2$ | 0.24–0.30 |
|---|---|
| $H_2O/K_2O$ | 35–65 |
| $SiO_2/Al_2O_3$ | 8–12 |

4. A process as claimed in claim 1, in which the $K_2O/Al_2O_3$ mole ratio is 2.85–2.95.

5. A process as claimed in claim 1, in which the separated mother liquor is heated to 200° C. or higher for at least 36 hours.

6. A process according to claim 1 wherein the temperature of the first gel is about 150° C.

* * * * *